United States Patent [19]

Scarpa

[11] Patent Number: 5,557,337
[45] Date of Patent: Sep. 17, 1996

[54] AUTOMATIC TELEVISION SIGNAL DETECTOR TO DIFFERENTIATE NTSC SIGNALS FROM HDJV/AJV SIGNALS

[75] Inventor: Carl G. Scarpa, Edison, N.J.

[73] Assignee: Hitachi America, Ltd., Tarrytown, N.Y.

[21] Appl. No.: 198,992

[22] Filed: Feb. 18, 1994

[51] Int. Cl.$^6$ .............................. H04N 5/46; H04N 5/455
[52] U.S. Cl. ......................................... 348/558; 348/555
[58] Field of Search ................................. 348/558, 555, 348/556, 557, 554, 553, 706, 638, 708, 725, 726, 727, 728, 604, 641, 426, 21, 445, 449; 455/74, 134, 130, 143, 89, 142; H04N 5/46, 5/455

[56] References Cited

U.S. PATENT DOCUMENTS

| | | | |
|---|---|---|---|
| 5,132,793 | 7/1992 | Hirahata et al. | 348/556 |
| 5,283,653 | 2/1994 | Citta | 348/725 |
| 5,361,099 | 11/1994 | Kim | 348/555 |

FOREIGN PATENT DOCUMENTS

| | | | |
|---|---|---|---|
| 2180474 | 7/1990 | Japan | H04N 5/46 |
| 3035673 | 2/1991 | Japan | H04N 5/46 |
| 5347736 | 12/1993 | Japan | H04N 5/46 |

OTHER PUBLICATIONS

"Advanced Digital Television", System Description Jan. 20, 1992, David Sarnoff Research Center and Philips Labs., pp. 30 and 63.

Primary Examiner—Safet Metjahic
Attorney, Agent, or Firm—Peter L. Michaelson; John T. Peoples; Michaelson & Wallace

[57] ABSTRACT

An incoming television signal to a television receiver is switched to either NTSC (National Television Systems Committee) processing circuitry (130) or ATV (Advanced Television) processing circuitry (140) as determined from power measurements in each of two separate sub-bands of the power spectrum of the incoming signal. The first power measurement is obtained from a sub-band (204) wherein the NTSC power spectrum has significant spectral energy, whereas the second power measurement is obtained from another sub-band (205) wherein the NTSC power spectrum has minimal spectral energy. If the first measurement exceeds the second measurement by a prescribed value, the television signal is processed by the NTSC circuitry; otherwise, the ATV circuitry effects processing of the incoming signal.

16 Claims, 3 Drawing Sheets

AUTOMATIC TELEVISION SIGNAL DETECTOR TO DIFFERENTIATE NTSC SIGNALS FROM HDJV/AJV SIGNALS

BACKGROUND OF THE DISCLOSURE

1. Field of the Invention

This invention relates generally to a television receiver and, more particularly, to circuitry and a concomitant methodology for automatically determining if the predominant incoming signal to the receiver is an NTSC signal or an ATV signal, and then selecting the identified television signal for video/aural processing.

2. Description of Related Art

High-Definition Television (HDTV) provides received video images that have higher resolution and wider aspect ratio than standard National Television Systems Committee (NTSC) video images, even though both HDTV and NTSC are allocated the same 6 MHz frequency bandwidth. The improvement is fostered by digital signal processing techniques employed in HDTV. The term HDTV as now used in the literature has a connotation which encompasses the systems of equipment that generate and display images as well as the images themselves, including such characteristics and parameters as signal-to-noise ratio, colorimetry, and mitigation of the effects of spurious signals or interference. In addition, the term Advanced Television (ATV) collectively describes HDTV and variations on HDTV, such as Extended Definition Television (EDTV), which is a system that has less refined performance characteristics than HDTV; the terms ATV and HDTV are used interchangeably herein without loss of generality.

To avoid obsolescence of the literally millions of NTSC receivers currently in use, the Federal Communication Commission (FCC) has mandated that HDTV systems must operate concurrently with existing terrestrial broadcast ("over-the-air") NTSC systems until the year 2008 without causing interference to or receiving interference from NTSC systems. This two-pronged approach means that each television station will originate two channels—one that will transmit an NTSC signal for a given television program, and another transmitting an HDTV counterpart to that program. This arrangement for broadcasting HDTV signals via terrestrial propagation thereby intermixes HDTV signals with conventional NTSC signals. For instance, Channel 4 may be assigned to an NTSC signal carrying a given TV program, whereas Channel 38 may be assigned to the HDTV signal carrying the identical TV program. There are currently only 68 assigned channels for carrying 6 Mhz bandwidth television signals—12 in the Very High Frequency (VHF) band, and 56 in the Ultra High Frequency (UHF) band. Accordingly, it is quite conceivable that one of these 68 channels (e.g., as above, Channel 38) may be assigned to carry an HDTV program in one city, whereas this same channel may carry a completely different NTSC-UHF program in a second, nearby city.

For convenience to the consumer/viewer and, indeed, for enhancing marketability and acceptance of HDTV by the consumer, it is a virtual requirement for the commercial environment that the television receiver be able to automatically differentiate among NTSC, HDTV, or noise. For instance, in the second situation presented above, if a viewer's television receiver is located in the first city, then the viewer expects that Channel 38 will display the HDTV program to the viewer (along with, of course, the corresponding audio signal). On the other hand, a viewer in the second city expects the NTSC program of Channel 38 to be displayed on the receiver. For this differentiation between HDTV and NTSC to be especially beneficial and thereby engender consumer acceptance of HDTV, the differentiation technique should allow for an automatic, rapid selection by circuitry integral to the receiver so as to expeditiously present both the video and audio signals. Accordingly, for a receiver configured with either multiple tuners or even a single tuner that accepts both NTSC and HDTV signals, it would be extremely advantageous in gaining consumer confidence for the receiver to transparently and quickly present the desired information to the viewer. In addition, an automatic circuit will allow for rapid channel changing by the viewer.

The art appears to be devoid of teachings or suggestions of how to differentiate among NTSC, HDTV, or noise using circuitry specially arranged for such purposes and which automatically effects rapid capture of the desired incoming signal.

Nevertheless, in order to detect and ultimately display the appropriate incoming signal, a receiver compatible with both NTSC and HDTV would typically be implemented with one demodulator for NTSC and another demodulator for HDTV since NTSC and HDTV each operate on different signal processing principles, with the former being analog and the latter being digital. Accordingly, one plausible but rudimentary technique for determining which type of signal is present would place substantial onus on the consumer—by requiring the consumer to alternately switch between the HDTV demodulator and the NTSC demodulator; by having the consumer view the respective displayed images to determine which intelligible signal, if any, is then present; and then by having the consumer make the ultimate selection of the incoming program based on the subjective determination. Another conjectured technique would only improve matters slightly in that the alternate outputs from each demodulator, as the viewer switches between demodulators, would be monitored by circuitry and, based upon measured parameters, a decision as to which is the predominant signal could then be accomplished, albeit semi-automatically. However, this technique would also possess the deleterious effect of still requiring viewer interaction, as well as a potentially distracting amount of time for the circuitry to acquire the information necessary to make an informed decision, during which time the TV screen displays no coherent information.

Therefore, a need exists in the art for a circuit that is capable of automatically differentiating between NTSC and HDTV signals without burdening the user or adversely affecting, to any noticeable extent (if at all), the quality of the displayed image.

SUMMARY OF THE INVENTION

These shortcomings as well as other limitations and deficiencies are obviated, in accordance with my invention, by circuitry which detects the power distribution of the different incoming NTSC and ATV signals and automatically selects the one of the signals in correspondence to the detected power distribution.

Broadly, in correspondence to an illustrative embodiment of the present invention, an incoming television signal is automatically switched to either NTSC processing circuitry or ATV processing circuitry based upon the results of two separate power measurements. The power in the incoming signal is measured in a sub-band of the NTSC power spectrum, that is expected to possess significant spectral energy, to thereby provide a first power level. Similarly, the power in the incoming signal is measured in another sub-band of the NTSC power spectrum, but one expected to have minimal spectral energy, to thereby provide a second power level. If the first power level exceeds the second power level by a predetermined value, the incoming signal is coupled to the NTSC processing circuitry. Otherwise, if the first power level and the second power level are substantially equal, the incoming signal is connected to the ATV processing circuitry.

BRIEF DESCRIPTION OF DRAWINGS

The teachings of the present invention can be readily understood by considering the following detailed description in conjunction with the accompanying drawings, in which.

To facilitate understanding, identical reference numerals have been used, where possible, to designate identical elements or components that are common to the figures.

DETAILED DESCRIPTION

Figure 1:
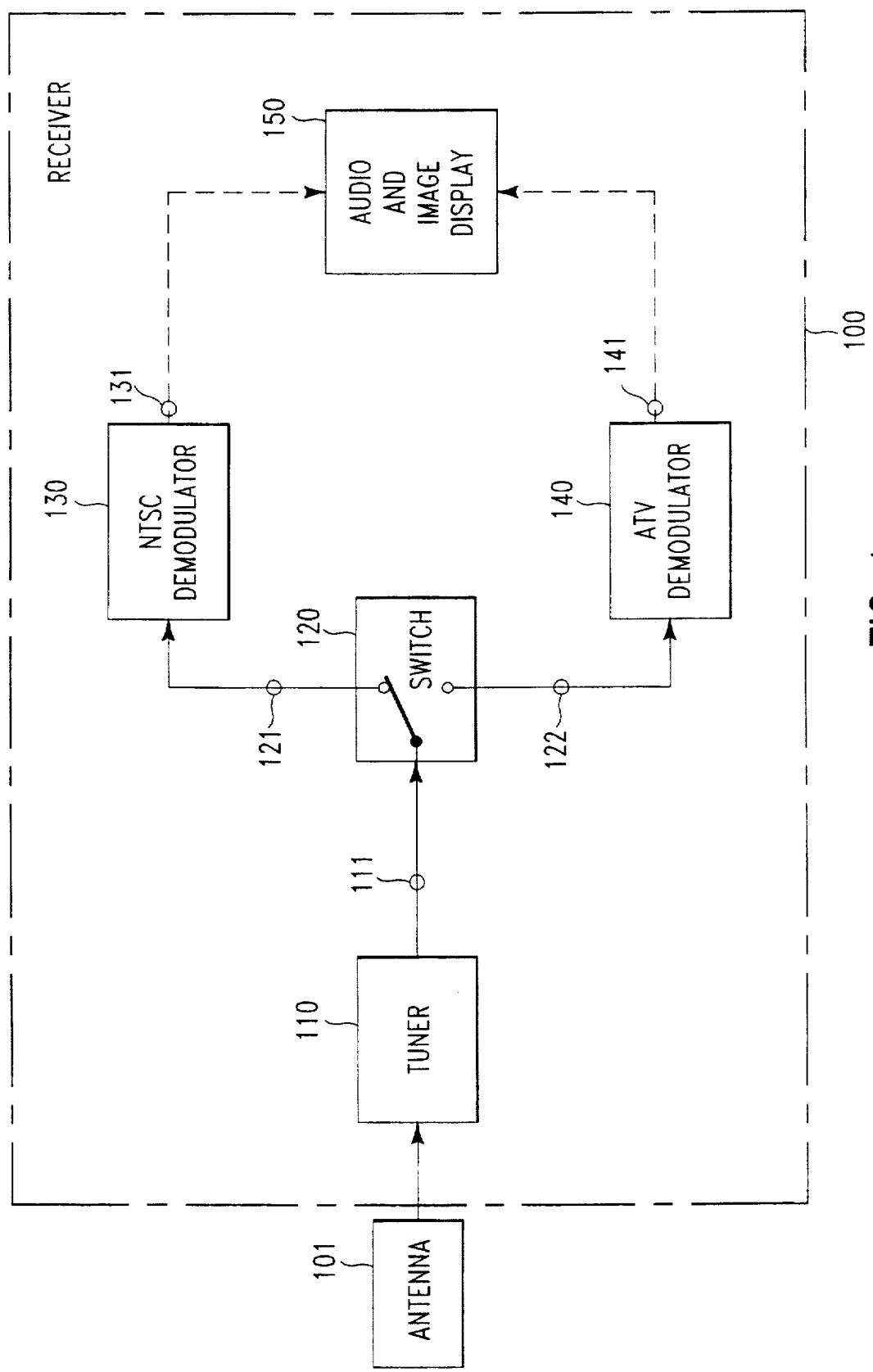
FIG. 1 is a block diagram of a receiver arranged to manually detect either an NTSC signal or an HDTV signal.

Reference is initially made to FIG. 1 so as to describe in broad terms a dual-function television receiver arranged to manually detect either an incoming NTSC signal or an HDTV signal. This description is then followed by an elucidation of the principles of the present invention, as based upon the insight provided by the power spectra plot of FIG. 2. Thereafter, an illustrative embodiment of the present invention is set forth by the block diagram of FIG. 3.

The block diagram of television receiver 100 shown in FIG. 1 depicts those elements of the receiver which are pertinent to the present invention. Receiver 100 comprises: tuner 110; manual switch 120; independent NTSC and ATV demodulators 130 and 140, respectively; and audio/image display circuitry 150. Tuner 110 is responsive to the signal detected by antenna 101—this signal may be either an NTSC signal, an ATV signal, or (for the sake of generality) noise. Tuner 110 performs the typical function of converting an incoming signal having a frequency spectrum in the VHF band or UHF band to the conventional intermediate frequency (IF) signal processing band. As alluded to earlier in the Background Section, manual switch 120 may be positioned to direct the output of tuner 110, which appears on lead 111, either to the NTSC processing circuitry having NTSC demodulator 130 as a processing element, or to the ATV processing circuitry having demodulator 140 as a processing element. Such an arrangement would be useful, for example, if the viewer knows beforehand that Channel 4 carries an NTSC signal and that Channel 38 carries an ATV signal. In the former case, switch 120 is set to couple tuner 110 to NTSC demodulator 130 by manually switching lead 111 to lead 121. In the latter case, tuner 110 is connected to ATV demodulator 140 by switching lead 111 to lead 122. The correctness of the viewer's knowledge about the presumed presence of the NTSC signal or the ATV signal is ultimately judged by the image actually presented to the viewer on image display 150.

Figure 2:
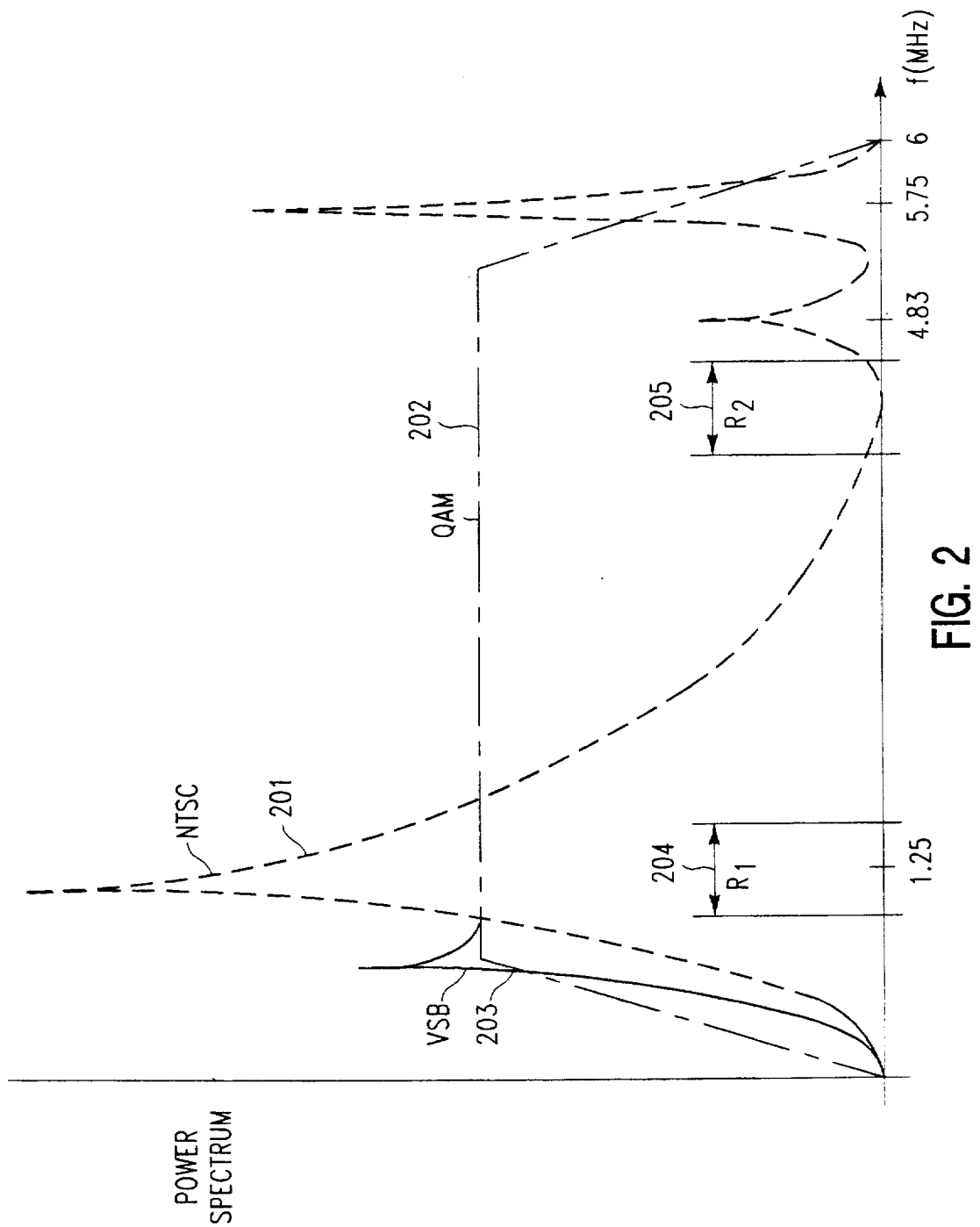
FIG. 2 is a plot of the power spectrum of 6 MHz NTSC, QAM-HDTV, and VSB-HDTV signals shown in overlay manner.

Referring now to FIG. 2, there is shown a plot in overlay fashion of the typical baseband power spectra/spectral energy of an NTSC signal (spectrum 201) and two types of HDTV signals, namely, HDTV signals that are broadcast using the standard modulation techniques of Quadrature Amplitude Modulation (QAM) (spectrum 202) and Vestigial Sideband (VSB) (spectrum 203). The luminance carrier for NTSC spectrum 201 is located at 1.25 MHz on the 0–6 MHz scale, whereas the audio carrier is located at 5.75 MHz. The frequency range encompassing the luminance carrier, denoted $R_1$ and referred to with reference numeral 204, contains the largest amount of localized power for the NTSC signal.

In QAM transmission, spectrum 202 is statistically flat across the majority of the 6 MHz band, except for roll-off at the band edges (due to transmitter filters). In VSB transmission, spectrum 203 conforms to spectrum 202 for QAM except for the carrier tone at the lower band edge (which is added to aid in demodulation).

It is now observed that a narrow passband filter centered at the NTSC luminance carrier frequency of 1.25 MHz could provide an output indicative of the presence or absence of the NTSC signal depending upon whether the output level of the filter exceeds or falls below a predetermined threshold. On the other hand, another narrow passband filter placed in a region of the NTSC spectrum having of small relative power, such as region $R_2$ located in the vicinity of 4.25 MHz and referred to by reference numeral 205, could provide an output indicative of the presence or absence of the HDTV signal (either QAM or VSB) depending upon the output level of this second filter and the threshold selected. (It should be noted that there are other regions of the NTSC power spectrum having small spectral energy contributions, but the choice of 4.25 MHz is based upon the small spectral contributions over a somewhat broad band of frequency, combined with avoiding potential problems with large frequency offsets that can be found in cable transmissions of television signals, as discussed in more detail shortly). It is further observed that, rather than using the individual output levels from the two narrow passband filters and comparing these levels to separate thresholds, the levels could be compared to one another. The results of the comparison could then be used to decide if a television signal is present and, if so, whether the signal represents the NTSC signal or the HDTV signal. The circuitry of FIG. 3 depicts an illustrative arrangement for employing the principles just elucidated.

Figure 3:
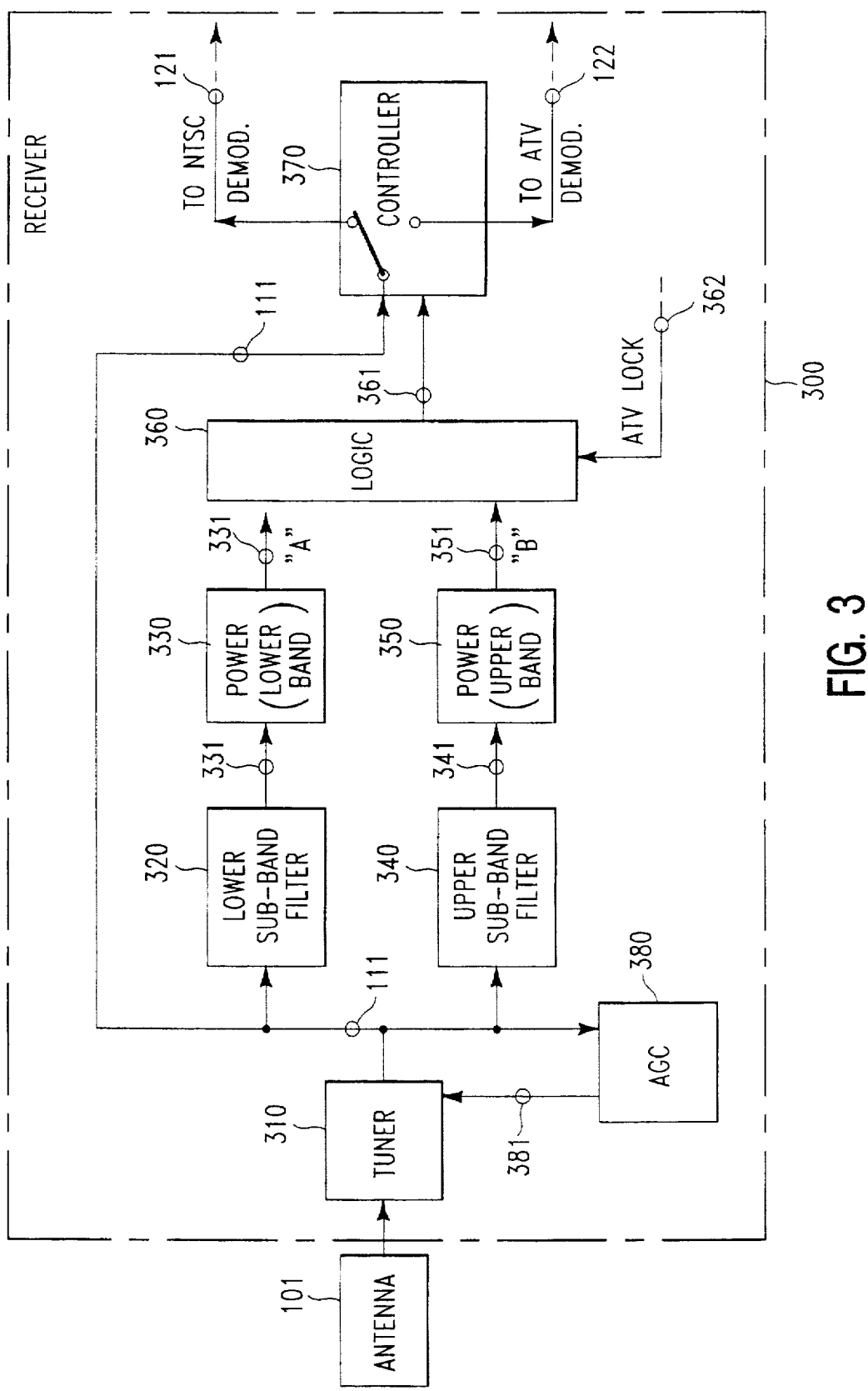
FIG. 3 is a block diagram of an illustrative embodiment of an automatic television signal detector in accordance with the present invention.

A block diagram of the automatic television signal detector (ATSD) is shown in FIG. 3. The ATSD includes: automatic gain circuit (AGC) 380; lower sub-band and upper sub-band narrow bandpass filters 320 and 340, respectively; lower sub-band and upper sub-band power measuring elements 330 and 350, respectively; logic circuit 360; and controller 370. AGC 380, which monitors the output of tuner 310 on lead 111 and feeds back a control signal to tuner 310 on lead 381, is included to insure that the incoming NTSC and HDTV signals are at an appropriate level to facilitate later comparison of filter output levels. Since the type of incoming signal is not known beforehand, AGC 380 cannot rely on any distinguishing characteristics of either the NTSC or HDTV signals. Consequently, AGC 380 operates in response to the total power received over the 6 MHz band. Moreover, AGC 380 has a time constant which is selected to compensate for fluctuations of the incoming signal as influenced by the transmission characteristics of the propagation medium between transmitter (not shown) and receiver under study. Given these two considerations, AGC 380 is otherwise realized in a conventional manner.

Assuming that AGC 380 has reached steady-state, the output of tuner 310, as available on lead 111, simultaneously serves as an input to both filters 320 and 340. Filter 320 is a narrow bandpass filter centered at 1.25 MHz relative to the 6 MHz baseband reference, whereas filter 340 is a narrow bandpass filter centered, preferably, at 4.25 MHz. Filter 320 is located in a sub-band of the NTSC power spectrum having significant spectral energy, whereas filter 340 is located in another sub-band of the NTSC power spectrum having minimal spectral energy. Each filter 320 or 340 is designed with a bandwidth that approximately equals the maximum offset expected from tuner 310. For instance, a typical television tuner may have an accuracy of ±100 kHz, so that preferably each filter has a bandwidth of 200 kHz as well as sharp transitions at the band edges to provide proper selectivity. A typical filter representative of either filter 320 or 340 has the following typical characteristics: a 3 dB bandwidth of 200 kHz, a stop-band loss of 40 dB, and a 100 kHz transition band at each band edge. Of course, it is readily contemplated by one with ordinary skill in the art that the filters may be altered by making the filter bandwidth narrower so as to improve signal discrimination; the tradeoff is, of course, that larger tuner offsets would degrade performance of the ATSD. Moreover, a narrower bandwidth would require a more complex filter design to achieve the desired selectivity.

The output of filter 320, appearing on lead 321, serves as the input to power measuring device 330. Device 330 is conventional and typically configured with a non-linear component, such as a squaring element or an absolute value circuit (e.g., full wave rectifier), followed by an averaging or a smoothing arrangement (e.g., a low-pass filter). The smoothing arrangement is typically characterized by a time constant. This time constant is selected such that a stable, slowly varying power measurement is obtained for the signal emitted by lead 331. Similarly, the output of filter 340, appearing on lead 341, serves as the input to conventional power measuring device 350. Device 350, similar to device 330, is also configured with a non-linear component combined with an averaging or a smoothing arrangement. The smoothing arrangement provides a stable, slowly varying power measurement on lead 351.

The power measurements appearing on leads 331 and 351 both serve as inputs to logic circuit 360. Logic circuit 360 is arranged to carry out the following comparisons. If the power level (designated "A") on the associated NTSC lead 331 is greater than the power level (designated "B") on the associated ATV lead 351 by a predetermined value, then the decision is made that the incoming signal to tuner 310 is an NTSC signal; accordingly, the output of logic 360, appearing on lead 361, causes controller 370 to automatically switch tuner lead 111 to NTSC lead 121, thereby providing the incoming signal to the NTSC signal processing circuitry (namely, the one having demodulator 130 as a processing element in FIG. 1). As an alternative comparison outcome, if power level A is substantially equal to power level B within a prescribed tolerance, then the assessment is made that the incoming signal is an HDTV signal. The power levels are approximately equal because the HDTV spectrum is essentially flat over both regions $R_1$ and $R_2$ of FIG. 2. For this alternative, the output of logic 360 causes tuner lead 111 to be connected to ATV lead 122 via controller 370.

An alternative technique to distinguish between NTSC and ATV signals is to arrange logic circuit 360 so that the actual power measurement from each of the filters 320 and 340 is assessed on an absolute, rather than a relative, scale. Of course, the actual power levels are dependent upon the total power reference used in AGC 380. But, given a properly functioning AGC circuit, thresholds may be selected to render a switching decision only on absolute power levels.

A potential ambiguity which has not been accounted for to this point is one wherein no television signal is presented to the input of tuner 310; this may occur, for example, if the channel selector dial is positioned by the viewer on a channel that has not been assigned to a television station. Thus, if tuner 310 has what is, in effect, "white noise" present at its input, filters 320 and 340 will measure approximately the same power. As was discussed above, the presence of an ATV signal at the input to tuner 310 also causes approximately equal power outputs from filters 320 and 340. To resolve this ambiguity, whenever the power levels are substantially equal, logic 360 signals controller 370 to switch tuner lead 111 to ATV lead 122. ATV modulator 140 is then monitored for a predetermined time interval to determine if modulator 140 "locks" onto an ATV signal. A lock may be indicated, for example, by detecting the synchronization pulse. If the lock signal, which is coupled to logic 360 from modulator 140 via lead 362, is not detected within the predetermined interval, then the determination is made that the incoming signal is not an ATV signal, but rather is a noise signal. Thus, logic 360 is further augmented to satisfy the logic conditions: (i) if power level A is substantially equal to power level B, and a lock is detected (lock=logic 1) within a prescribed time interval, then tuner lead 111 remains connected to lead 122; (ii) if power level A is substantially equal to power level B, and lock=logic 0, then noise is present at the input to tuner 310, and controller 370 may remain connected to lead 122 or may be switched to lead 121—in effect, this is a "don't care" state for this embodiment. However, the information derived from condition (ii) would be particularly useful in a channel scanning mode of operation wherein the fact that no signal is present for the given channel may be stored, say, in a memory. Then, during the scanning mode, the particular channel not having a signal could be skipped with reference to the memory to mitigate processing and thereby expedite channel scanning.

An alternative technique for resolving the ambiguity is to examine the actual power levels present on leads 331 and 351. Since white noise has a uniformly flat spectrum over the total 6 MHz band, the output level maintained by AGC 380 will be less than the output level maintained if an ATV signal is present because the ATV signal has power roll-off at the band edges (which can occupy up to 1 Mhz). Thus, the gain factor of AGC 380 is larger for an ATV signal than for white noise. The relative differences of the gain factor can be used to differentiate between an ATV signal and white noise without the need of monitoring the demodulator for a "lock" condition.

Whereas the foregoing discussion has basically focused on terrestrial broadcast, other modes of television transmission can be employed instead. For example, television signals are communicated via coaxial cable or fiber optic cable. It is the typical practice of the cable industry to offset NTSC signals from their normal terrestrial frequency assignment; the offset can be as large as a few hundred kilohertz. Even in view of this offset, the ATSD will function, with these cable based signals, essentially as described above since the NTSC signal still possesses a larger concentration of spectral energy around the luminance carrier as compared to the power of the shifted NTSC signal in the region encompassing 4.25 MHz. The power detected for either shifted QAM or VSB signals is basically unaffected by the offset because of the statistical flatness of the power spectra.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims.

The invention illustratively disclosed herein may be practiced without any element which is not specifically disclosed herein.

I claim:

1. A method for automatically switching an incoming intermediate frequency (IF) television signal for processing by either NTSC circuitry or ATV circuitry, the method comprising the steps of measuring the power in the incoming IF television signal in a sub-band of the NTSC power spectrum having significant spectral energy to produce a first power level, concurrently measuring the power in the incoming IF television signal in a sub-band of the NTSC power spectrum having minimal spectral energy to produce a second power level, and switching the incoming IF television signal for processing in response to the relative power between the first power level and the second power level.

2. The method as recited in claim 1 wherein the step of switching includes the step of connecting the incoming television signal to the NTSC circuitry if the first power level exceeds the second power level by a predetermined value.

3. The method as recited in claim 1 wherein the step of switching includes the step of connecting the incoming television signal to the ATV circuitry if the first power level and the second power level are substantially equal.

4. A method for automatically routing an incoming intermediate frequency (IF) television signal to either NTSC processing circuitry or ATV processing circuitry, the method comprising the steps of filtering the incoming IF television signal with a first narrow bandpass filter centered within a first region of the NTSC power spectrum having significant spectral energy to produce a first power level, concurrently filtering the incoming IF television signal with a second narrow bandpass filter centered within a second region of the NTSC power spectrum having minimal spectral energy to produce a second power level, and connecting the incoming IF television signal to the NTSC processing circuitry if the first power level exceeds the second power level by a predetermined value.

5. The method as recited in claim 4 further including the step of connecting the incoming television signal to the ATV processing circuitry if the first power level is substantially equal to the second power level.

6. The method as recited in claim 4 wherein said first region includes the luminance carrier frequency.

7. A method for automatically selecting an incoming intermediate frequency (IF) television signal for processing by either NTSC processing circuitry or ATV processing circuitry, the method comprising the steps of filtering the incoming IF television signal with a first narrow bandpass filter which encompasses the luminance carrier frequency in the NTSC power spectrum to produce a first power level, concurrently filtering the incoming IF television signal with a second narrow bandpass filter centered within a second region of the NTSC power spectrum having minimal spectral energy to produce a second power level, and connecting the incoming IF television signal to the NTSC processing circuitry if the first power level exceeds the second power level by a predetermined value.

8. The method as recited in claim 7 further including the step of connecting the incoming television signal to the ATV processing circuitry if the first power level is substantially equal to the second power level.

9. Circuitry for automatically switching an incoming intermediate frequency (IF) television signal for processing by either NTSC circuitry or ATV circuitry, the circuitry comprising means for measuring the power in the incoming IF television signal in a first sub-band of the NTSC power spectrum having significant spectral energy to produce a first power level, means for concurrently measuring the power in the incoming IF television signal in a second sub-band of the NTSC power spectrum having minimal spectral energy to produce a second power level, and means, coupled to both means for measuring, for switching the incoming IF television signal for processing in response to the relative power between the first power level and the second power level.

10. The circuitry as recited in claim 9 wherein the means for switching includes means for connecting the incoming television signal to the NTSC circuitry if the first power level exceeds the second power level by a predetermined value.

11. The circuitry as recited in claim 9 wherein the means for switching includes means for connecting the incoming television signal to the ATV circuitry if the first power level and the second power level are substantially equal.

12. The circuitry as recited in claim 9 wherein the means for measuring includes a first narrow bandpass filter for producing the first power level and a second narrow bandpass filter for producing the second power level.

13. The circuitry as recited in claim 12 wherein the means for measuring includes a first power detector coupled to the first filter and a second power detector coupled to the second filter.

14. The circuitry as recited in claim 12 wherein the means for measuring includes automatic gain control means, coupled to the incoming television signal, for automatically adjusting and maintaining the incoming power level of the incoming television signal.

15. The circuitry as recited in claim 12 wherein the means for switching includes logic means, coupled to the first power detector and the second power detector, for comparing the first power level and the second power level.

16. The circuitry as recited in claim 15 wherein the means for switching includes controller means, coupled to the incoming television signal, the NTSC circuitry, the ATV circuitry, and the logic means, for connecting the incoming television signal to either the NTSC circuitry or the ATV circuitry in response to the output of the logic means determined as a result of the comparison of the first power level to the second power level.

\* \* \* \* \*

UNITED STATES PATENT AND TRADEMARK OFFICE
CERTIFICATE OF CORRECTION

PATENT NO. : 5,557,337
DATED : Sep. 17, 1996
INVENTOR(S) : Carl G. Scarpa

It is certified that error appears in the above-indentified patent and that said Letters Patent is hereby corrected as shown below:

On the title page item [54], line 3, Delete "HDJV/AJV" and replace with --HDTV/ATV--.

Signed and Sealed this

Tenth Day of December, 1996

Attest:

BRUCE LEHMAN

*Attesting Officer*  *Commissioner of Patents and Trademarks*